United States Patent
Inoue

(10) Patent No.: US 7,150,536 B2
(45) Date of Patent: Dec. 19, 2006

(54) PROJECTOR AND PROJECTION IMAGE CORRECTION METHOD THEREOF

(75) Inventor: Hideaki Inoue, Musashimurayama (JP)

(73) Assignee: Casio Computer Co., Ltd., Tokyo (JP)

(*) Notice: Subject to any disclaimer, the term of this patent is extended or adjusted under 35 U.S.C. 154(b) by 114 days.

(21) Appl. No.: 10/912,817

(22) Filed: Aug. 6, 2004

(65) Prior Publication Data
US 2005/0030487 A1    Feb. 10, 2005

(30) Foreign Application Priority Data
Aug. 8, 2003    (JP) ............... 2003-290841

(51) Int. Cl.
  G03B 21/60    (2006.01)
  G03B 21/14    (2006.01)
  G03B 21/26    (2006.01)
(52) U.S. Cl. ............ 353/69; 353/70; 353/30; 348/746
(58) Field of Classification Search ............ 353/69–70, 353/30, 122; 348/744, 746, 806
  See application file for complete search history.

(56) References Cited

U.S. PATENT DOCUMENTS

| | | | |
|---|---|---|---|
| 6,367,933 B1* | 4/2002 | Chen et al. ............ | 353/69 |
| 6,416,186 B1* | 7/2002 | Nakamura ............ | 353/69 |
| 6,520,646 B1* | 2/2003 | Rodriguez et al. ...... | 353/69 |
| 2002/0038462 A1* | 3/2002 | Sakakibara et al. ...... | 725/151 |
| 2003/0043303 A1* | 3/2003 | Karuta et al. ......... | 348/744 |
| 2005/0012907 A1* | 1/2005 | Inoue ................ | 353/70 |

FOREIGN PATENT DOCUMENTS

| | | |
|---|---|---|
| EP | 1 193 541 A2 | 4/2002 |
| JP | 2003-122617 A | 4/2000 |
| JP | 2002-189442 A | 7/2002 |
| WO | WO 00/21282 A1 | 4/2000 |
| WO | WO 02/101443 A2 | 12/2002 |

* cited by examiner

Primary Examiner—W. B. Perkey
Assistant Examiner—Magda Cruz
(74) Attorney, Agent, or Firm—Frishauf, Holtz, Goodman & Chick, P.C.

(57) ABSTRACT

A transformation coefficient storing unit has correction tables which are generated based on classification of zooming magnification in a manner of arithmetic progression. An optical mechanism unit supplies information on a zooming magnification Z to a switch control unit of the transformation coefficient storing unit. The switch control unit controls a table selection unit to select any from the correction tables based on the zooming magnification Z. The transformation coefficient storing unit selects a coefficient set from the selected correction table based on inclination angles θH and θV and supplies the selected coefficient set to a trapezoidal correction unit. The trapezoidal correction unit performs trapezoidal correction based on the supplied coefficient set.

6 Claims, 10 Drawing Sheets

1 : PROJECTOR
2 : SCREEN

FIG. 3

| | θH=-30 | θH=-20 | θH=-10 | θH=0 | θH=+10 | θH=+20 | θH=+30 |
|---|---|---|---|---|---|---|---|
| θV=+30 | COEFFICIENT SET 1 | COEFFICIENT SET 2 | COEFFICIENT SET 3 | COEFFICIENT SET 4 | COEFFICIENT SET 5 | COEFFICIENT SET 6 | COEFFICIENT SET 7 |
| θV=+20 | COEFFICIENT SET 8 | COEFFICIENT SET 9 | COEFFICIENT SET 10 | COEFFICIENT SET 11 | COEFFICIENT SET 12 | COEFFICIENT SET 13 | COEFFICIENT SET 14 |
| θV=+10 | COEFFICIENT SET 15 | COEFFICIENT SET 16 | COEFFICIENT SET 17 | COEFFICIENT SET 18 | COEFFICIENT SET 19 | COEFFICIENT SET 20 | COEFFICIENT SET 21 |
| θV=+0 | COEFFICIENT SET 22 | COEFFICIENT SET 23 | COEFFICIENT SET 124 | COEFFICIENT SET 25 | COEFFICIENT SET 26 | COEFFICIENT SET 27 | COEFFICIENT SET 28 |
| θV=-10 | COEFFICIENT SET 29 | COEFFICIENT SET 30 | COEFFICIENT SET 31 | COEFFICIENT SET 32 | COEFFICIENT SET 33 | COEFFICIENT SET 34 | COEFFICIENT SET 35 |
| θV=-20 | COEFFICIENT SET 36 | COEFFICIENT SET 37 | COEFFICIENT SET 38 | COEFFICIENT SET 39 | COEFFICIENT SET 40 | COEFFICIENT SET 41 | COEFFICIENT SET 42 |
| θV=-30 | COEFFICIENT SET 43 | COEFFICIENT SET 44 | COEFFICIENT SET 45 | COEFFICIENT SET 46 | COEFFICIENT SET 47 | COEFFICIENT SET 48 | COEFFICIENT SET 49 |

PROJECTOR AND PROJECTION IMAGE CORRECTION METHOD THEREOF

BACKGROUND OF THE INVENTION

1. Field of the Invention

The present invention relates to a projector and a projection image correction method thereof.

2. Description of the Related Art

A projector (projection arrangement) is an apparatus for displaying an image on a screen. If the optical axis of the projector is inclined with respect to the screen surface, the image displayed on the screen surface is distorted. To avoid this, as disclosed in Unexamined Japanese Patent Application KOKAI Publication No. 2000-122617 (pp. 4 to 7, FIG. 1 and FIG. 2), there has been proposed a projector having a trapezoidal correction unit which corrects a distortion of a projection image based on an inclination of the optical axis of the projector with respect to the screen surface, so that despite of this inclination, an undistorted image will be displayed on the screen surface.

Some projectors have a zooming mechanism. The trapezoidal correction unit of a projector having a zooming mechanism performs trapezoidal correction after the zooming magnification is set.

Conventional projectors have to perform trapezoidal correction twice, because the first trapezoidal correction made based on the angle of inclination is canceled if the zooming magnification is changed.

The present invention was made in consideration of the conventional problem, and an object of the present invention is to provide a projector and a projection image correction method thereof which are capable of appropriately performing correction of a projection image even if the zooming magnification is changed.

SUMMARY OF THE INVENTION

One of the preferred embodiments of the present invention is a projector for projecting a projection light to a screen surface to form a projection image thereon, comprising:

a projection unit which has a zooming function, and coverts image information of a supplied projection image into information of a projection light and projects the projection light onto the screen surface;

a correction unit which corrects by inverse transformation using transformation coefficients, a projection image on the screen surface which projection image is distorted due to inclinations of an optical axis of the projection light with respect to the screen surface, and supplies information of the corrected projection image to the projection unit; and a transformation coefficient supply unit which obtains information regarding a zooming magnification of the projection unit and inclination angles of the optical axis of the projection light with respect to the screen surface, selects the transformation coefficients from preset transformation coefficients based on the obtained zooming magnification and inclination angles, and supplies the selected transformation coefficients to the correction unit.

Another one of the preferred embodiments of the present invention is a projection image correction method for correcting a projection image of a projector, comprising:

a step of obtaining information regarding a zooming magnification of the projector and inclination angles of an optical axis of a projection light of the projector with respect to a screen surface;

a step of storing a plurality of transformation coefficients which are preset for correcting the projection image by inverse transformation, in association with each zooming magnification and each inclination angle;

a step of obtaining the zooming magnification and inclination angles of the projector; and a step of selecting transformation coefficients from the plurality of stored transformation coefficients based on the obtained zooming magnification and inclination angles, and correcting the projection image by inverse transformation based on the selected transformation coefficients.

BRIEF DESCRIPTION OF THE DRAWINGS

These objects and other objects and advantages of the present invention will become more apparent upon reading of the following detailed description and the accompanying drawings in which:

FIG. 3 is an explanatory diagram showing a content of a correction table shown in FIG. 1;

DETAILED DESCRIPTION OF THE PREFERRED EMBODIMENTS

Projectors according to the embodiments of the present invention will now be explained with reference to the drawings.

(First Embodiment)

Figure 1:
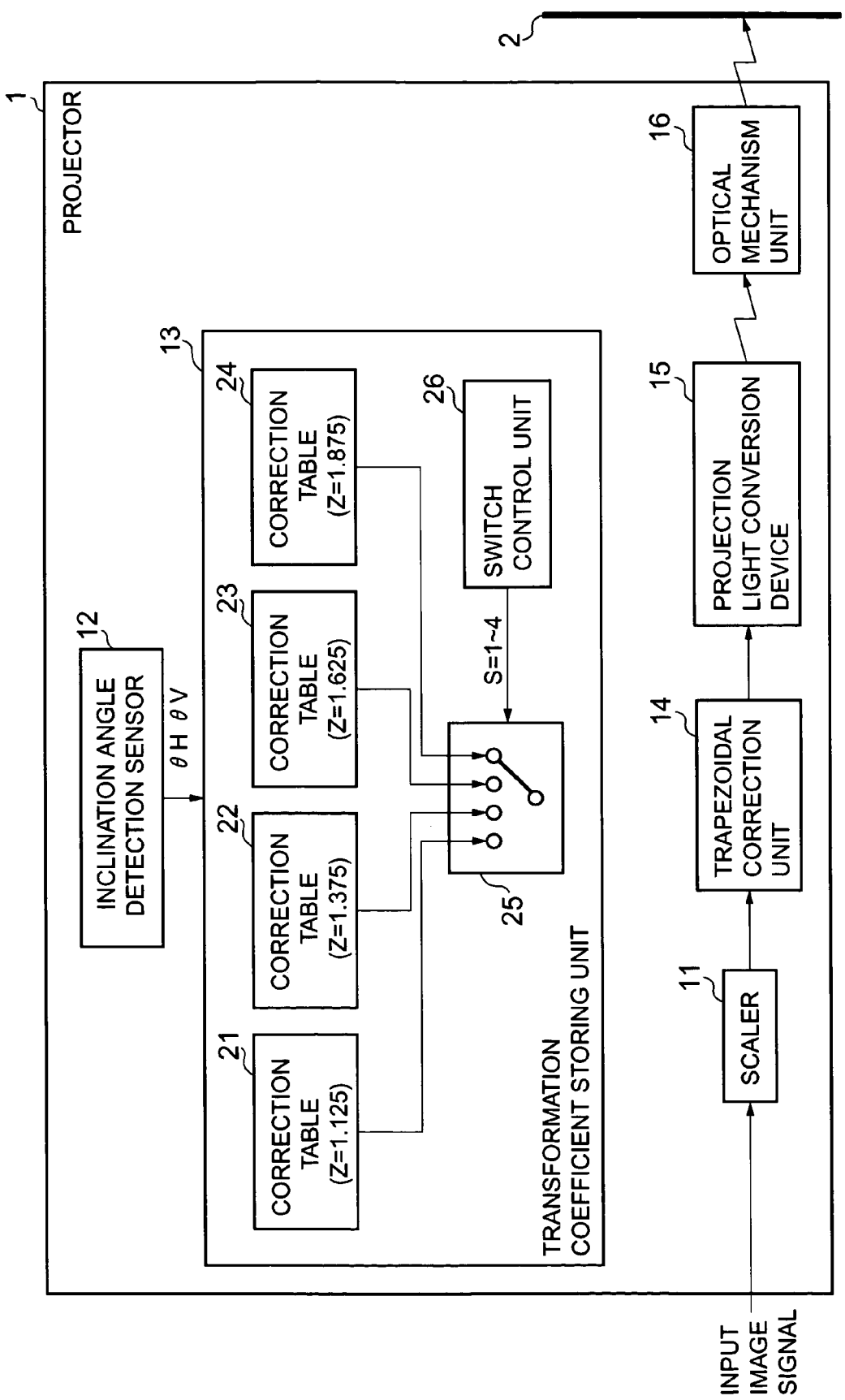
FIG. 1 is a block diagram showing a configuration of a projector according to a first embodiment of the present invention.

FIG. 1 shows the configuration of a projector according to the first embodiment of the present invention.

The projector 1 according to the first embodiment comprises a scaler 11, an inclination angle detection sensor 12, a transformation coefficient storing unit 13, a trapezoidal correction unit 14, a projection light conversion device 15, and an optical mechanism unit 16.

The scaler 11 adjusts the resolution of an input image signal.

The inclination angle detection sensor 12 detects an inclination angle $\theta H$ and inclination angle $\theta V$ of an actual screen with respect to an ideal screen penetrated by the optical axis of the projector 1 perpendicularly, where the inclination angle θH is an angle of inclination in the horizontal direction with respect to the ideal screen and the inclination angle θV is an angle of inclination in the vertical direction with respect to the ideal screen.

A screen 2 shown in FIG. 1 is perpendicular to the ground planar surface. Since the screen 2 is perpendicular to the ground planar surface, the inclination angles θH and θV are equal to the angles of inclination of the optical axis with respect to the surface of the screen 2.

The inclination angle detection sensor 12 is constituted by a distance measuring sensor which measures the distances between the projector 1 and a plurality of distance measurement points on the screen 2. The inclination angle detection sensor 12 detects the inclination angles θH and θV by measuring the distances between the projector 1 and a plurality of distance measurement points. However, note that in order to detect the inclination angle θV, the inclination angle detection sensor 12 may be constituted by an acceleration sensor.

The transformation coefficient storing unit 13 stores a plurality of coefficient sets used for trapezoidal correction. The transformation coefficient storing unit 13 obtains zooming magnification information and inclination angles θH and θV, selects any of the coefficient sets based on them, and supplies the selected coefficient set to the trapezoidal correction unit 14. The projector 1 comprises a zooming mechanism in the optical mechanism unit 16. The transformation coefficient storing unit 13 obtains zooming magnification information and inclination angles θH and θV from the optical mechanism unit 16 and the inclination angle detection sensor 12 respectively.

Figure 2:
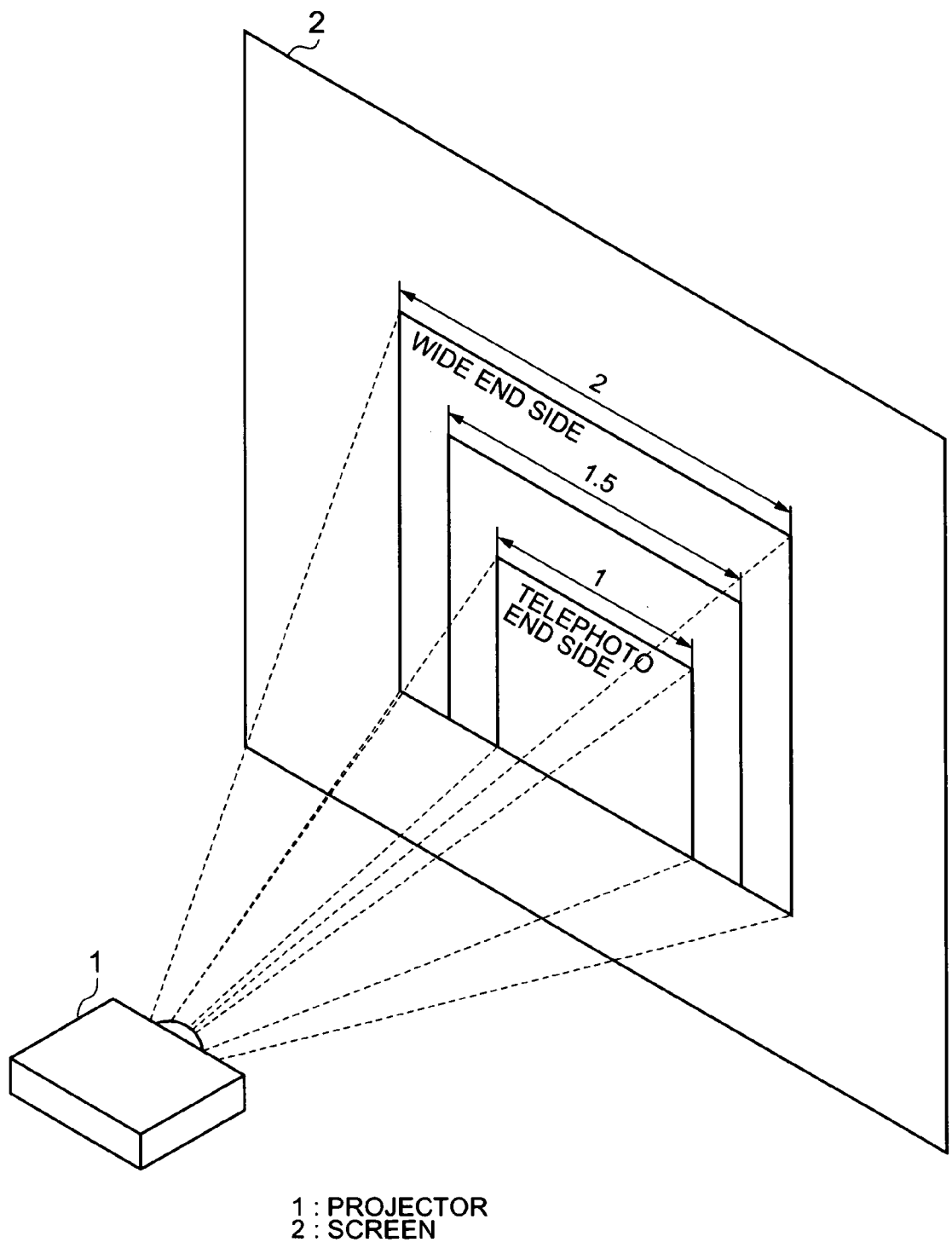
FIG. 2 is an explanatory diagram for explaining zooming magnification of the projector shown in FIG. 1.

The zooming magnification indicates the size of a projection image when the size of the telephoto end side is seen as 1, as shown in FIG. 2. According to the first embodiment, the zooming magnification is represented by Z and its range is defined as $1 \leq Z \leq 2$. $Z=2$ is a zooming magnification of the wide end side. In a case where the size of a projection image is 1.5-fold the size of the telephoto end side, the zooming magnification is 1.5.

Generally, the zooming magnification of the projector 1 is in inverse proportion to the focal length of a lens comprised in the optical mechanism unit 16, which is different from the characteristic of the zooming magnification of an ordinary camera that is in direct proportion to the focal length.

Referring back to FIG. 1, the transformation coefficient storing unit 13 comprises a correction tables 21 to 24, a table selection unit 25, and a switch control unit 26.

The correction table 21 is a table in which coefficient sets for the zooming magnification $Z=1.125$ are set. The coefficient set is a group of transformation coefficients used for trapezoidal correction. The transformation coefficients include information regarding zooming magnification and information regarding inclination angles θH and θV.

As shown in FIG. 3, in the correction table 21, each of the inclination angles θH and θV is segmented by the unit of 10-degree increment, and coefficient sets 1 to 49 are set in the respective segments of the inclination angles θH and θV. The coefficient sets 1 to 49 are set in advance based on the zooming magnification Z and the inclination angles θH and θV.

In a case where the correction table 21 is selected, the transformation coefficient storing unit 13 selects any of the coefficient sets 1 to 49 from the correction table 21 based on the inclination angles θH and θV supplied from the inclination angle detection sensor 12 and outputs the selected coefficient set.

Figure 4:
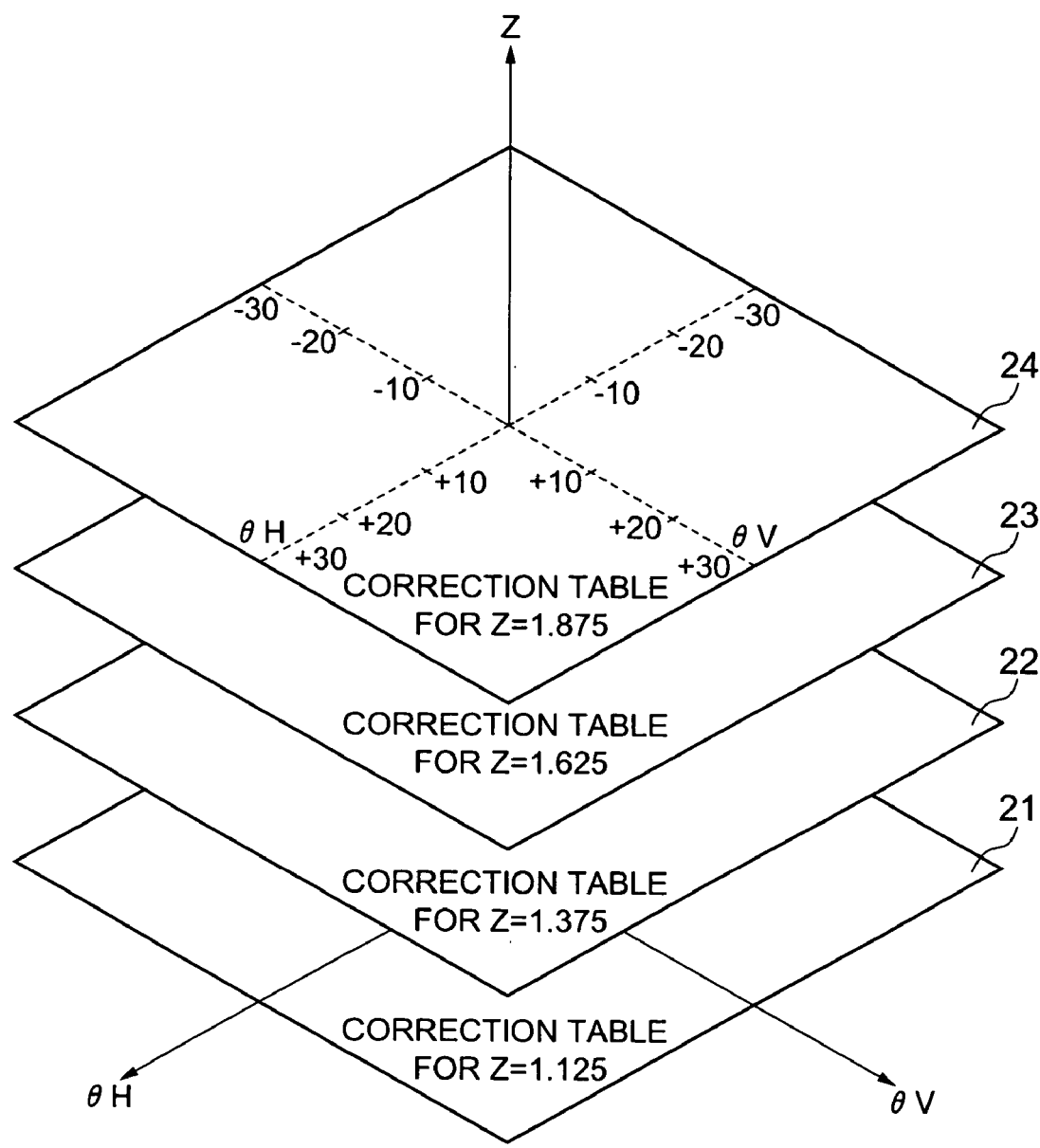
FIG. 4 is an explanatory diagram showing a plurality of correction tables of FIG. 1 as three-dimensional tables.

The correction tables 22 to 24 shown in FIG. 1 are configured in the same way as the correction table 21. The correction table 22 is a table in which coefficient sets for the zooming magnification $Z=1.375$ are set. The correction table 23 is a table in which coefficient sets for the zooming magnification $Z=1.625$ are set. The correction table 24 is a table in which coefficient sets for the zooming magnification $Z=1.875$ are set. In this manner, the zooming magnifications Z of the correction tables 21 to 24 are set to form an arithmetic progression. The correction tables 21 to 24 are represented by three-dimensional tables as shown in FIG. 4.

The interval between the zooming magnifications Z is set such that trapezoidal correction needs not to be performed twice even if there is a difference between the zooming magnification Z set by the optical mechanism unit 16 and a zooming magnification calculated by a coefficient set output from the transformation coefficient storing unit 13.

The table selection unit 25 selects any one of the correction tables 21 to 24 according to the value of a selection signal S supplied from the switch control unit 26.

If the value of the selection signal S is 1, the table selection unit 25 selects the correction table 21. If the value of the selection signal S is 2, the table selection unit 25 selects the correction table 22. If the value of the selection signal S is 3, the table selection unit 25 selects the correction table 23. If the value of the selection signal S is 4, the table selection unit 25 selects the correction table 24.

The switch control unit 26 controls the table selection unit 25 by setting the value of the selection signal S based on the zooming magnification Z supplied from the optical mechanism unit 16 and by supplying this selection signal S to the table selection unit 25.

If the supplied zooming magnification Z is $1 \leq Z < 1.25$, the switch control unit 26 sets 1 to the selection signal S. If the supplied zooming magnification Z is $1.25 \leq Z < 1.5$, the switch control unit 26 sets 2 to the selection signal S. If the supplied zooming magnification Z is $1.5 \leq Z < 1.75$, the switch control unit 26 sets 3 to the selection signal S. If the supplied zooming magnification Z is $1.75 \leq Z \leq 2$, the switch control unit 26 sets 4 to the selection signal S.

The projector 1 comprises, for example, a microcomputer (not shown) including a CPU (Central Processing Unit), a ROM (Read Only Memory), a RAM (Random Access Memory), etc. By the projector 1 comprising this microcomputer, the switch control unit 26 performs a later-described flowchart to control the table selection unit 25.

The trapezoidal correction unit 14 performs trapezoidal correction on an image signal whose resolution has been corrected by the scaler 11, based on the inclination angles θH and θV and the zooming magnification Z.

Figure 5:
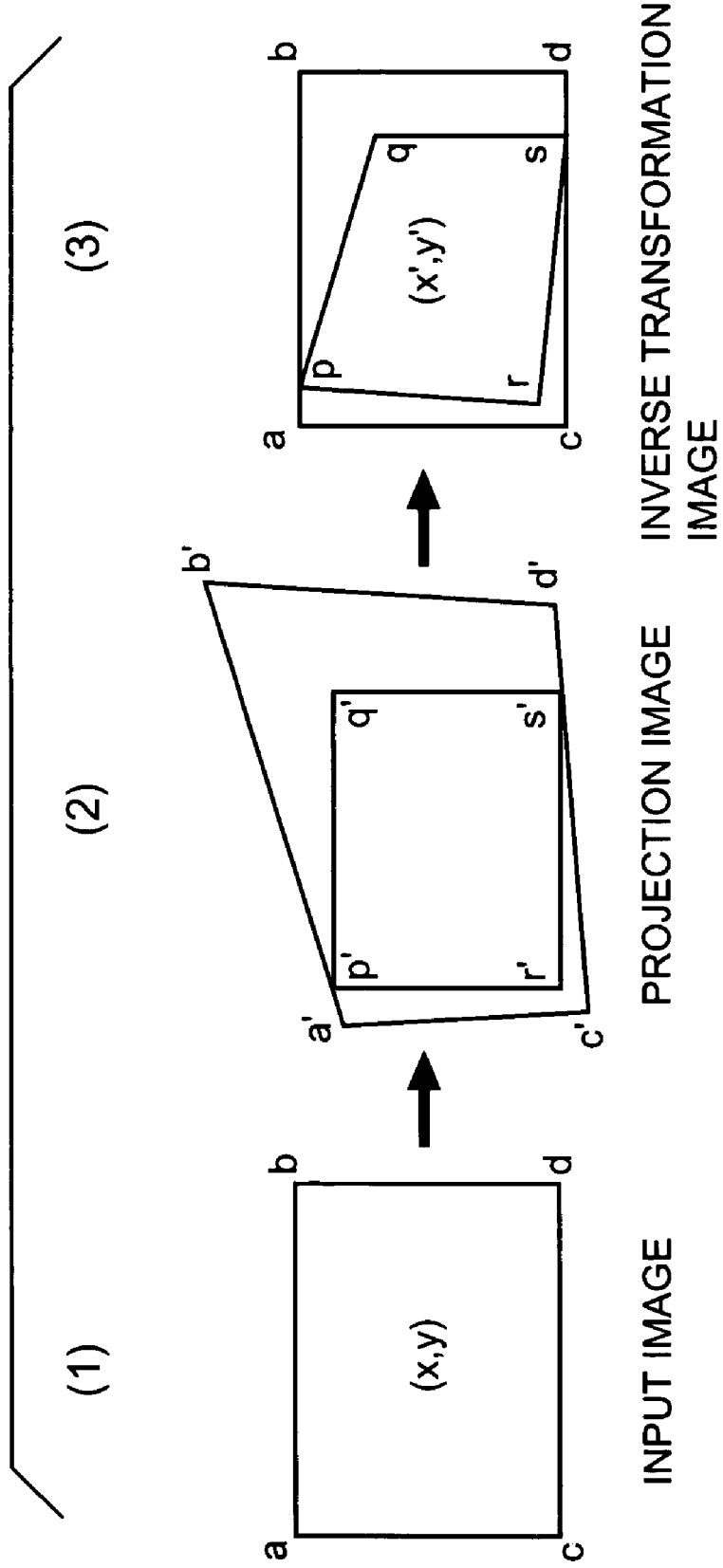
FIG. 5 illustrates explanatory diagrams for explaining an operation of a trapezoidal correction unit shown in FIG. 1, where (1) shows an input image, (2) shows relationship between a projection image projected on a screen and the projection image obtained by trapezoidal correction, and (3) shows the projection image obtained by inverse transformation.

An image input to the projector 1 is shown in FIG. 5(1) as a quadrangle abcd, and its projection image at the inclination angles θH and θV is shown in FIG. 5(2) as a quadrangle a'b'c'd'. The trapezoidal correction unit 14 cuts out a quadrangle p'q'r's' such that it is placed within the quadrangle a'b'c'd'. The trapezoidal correction unit 14 performs trapezoidal correction by inversely transforming the quadrangle p'q'r's' to generate an inverse transformation image pqrs as shown in FIG. 5(3).

It is assumed that the position of the data representing the input image abcd is specified as coordinates (x, y) as shown in FIG. 5(1), and the position of the data representing the inverse transformation image pqrs is specified as coordinates (x', y') as shown in FIG. 5 (3). This implies that the trapezoidal correction is performed by moving the pixel data specified by the coordinates (x, y) to the coordinates (x', y').

The coordinates (x', y') are represented as x'=f1(x, y) and y'=f2(x, y). If the inverse functions of the functions f1 and f2 are functions f3 and f4, the coordinates (x, y) is represented as x=f3(x', y') and y=f4(x', y').

Although the functions f1 to f4 are determined depending on the configuration of the trapezoidal correction unit 14, a function f for coordinate transformation is generally represented by a polynomial as represented by the following equation 1.

$$f(x, y)=a+bx+cy+dxy+ex^2+fy^2 \quad \text{[Equation 1]}$$

The coefficients a, b, c, d, e, and f in the equation 1 are the transformation coefficients. The set of these transformation coefficients is the coefficient set stored in the correction tables 21 to 24.

The inclination angles θH and θV are independent of the zooming magnification Z, while these transformation coefficients are dependent on the inclination angles θH and θV and the zooming magnification Z. That is, these transformation coefficients change when the inclination angles θH and θV change and also when the zooming magnification Z changes.

The coefficient set is obtained by multiple linear regression analysis based on the relationship among the plurality of coordinates (x, y) and (x', y') and the equation 1.

The projection light conversion device 15 converts the image information corrected by the trapezoidal correction unit 14 into a projection light representing the image.

The optical mechanism unit 16 controls the focus so that an image is formed on the screen 2, and projects the projection light obtained by the conversion of the projection light conversion device 15 onto the screen 2. The optical mechanism unit 16 comprises the zooming mechanism as described above, and adjusts the zooming magnification Z and supplies the zooming magnification Z to the switch control unit 26 of the transformation coefficient storing unit 13.

Next, the operation of the projector 1 according the first embodiment will be explained.

When an image signal is input to the projector 1, the scaler 11 adjusts the resolution of this image signal.

The inclination angle detection sensor 12 detects the inclination angles θH and θV of the projector 1, and supplies the detected inclination angles θH and θV to the transformation coefficient storing unit 13.

Meanwhile, the optical mechanism unit 16 supplies information on the zooming magnification Z to the switch control unit 26 of the transformation coefficient storing unit 13.

Figure 6:
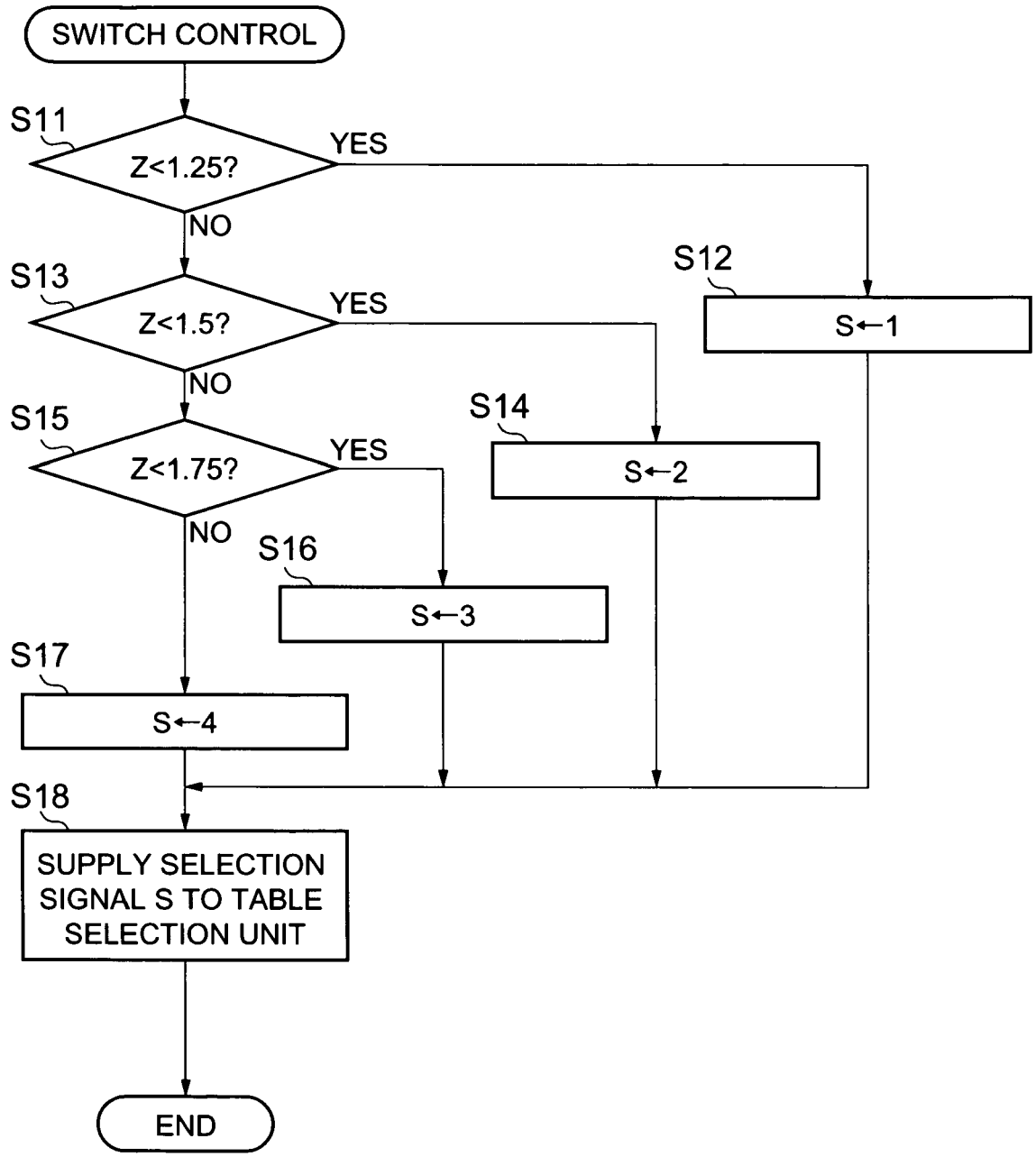
FIG. 6 is a flowchart showing a content of a table switch control process performed by a switch control unit shown in FIG. 1.

When supplied with the zooming magnification Z from the optical mechanism unit 16, the switch control unit 26 of the transformation coefficient storing unit 13 controls the table selection unit 25 according to a flowchart shown in FIG. 6, and performs switch control of the correction tables 21 to 24.

The switch control unit 26 determines whether or not the zooming magnification Z is smaller than 1.25 (step S11).

In a case where determining that the zooming magnification Z is smaller than 1.25 (step S11: Yes), the switch control unit 26 sets 1 to the selection signal S (step S12).

In a case where determining that the zooming magnification Z is not smaller than 1.25 (step S11: No), the switch control unit 26 determines whether or not the zooming magnification Z is smaller than 1.5 (step S13).

In a case where determining that the zooming magnification Z is smaller than 1.5 (step S13: Yes), the switch control unit 26 sets 2 to the selection signal S (step S14).

In a case where determining that the zooming magnification Z is not smaller than 1.5 (step S13: No), the switch control unit 26 determines whether or not the zooming magnification Z is smaller than 1.75 (step S 15).

In a case where determining that the zooming magnification Z is smaller than 1.75 (step S15: Yes), the switch control unit 26 sets 3 to the selection signal S (step S16).

In a case where determining that the zooming magnification Z is not smaller than 1.75 (step S15: No), the switch control unit 26 sets 4 to the selection signal S (step S17).

The switch control unit 26 supplies the selection signal S to which the value is set, to the table selection unit 25 (step S18).

The table selection unit 25 selects any one of the correction tables 21 to 24 in accordance with the value of the supplied selection signal S.

Next, this operation will be explained in detail.

Figure 7:
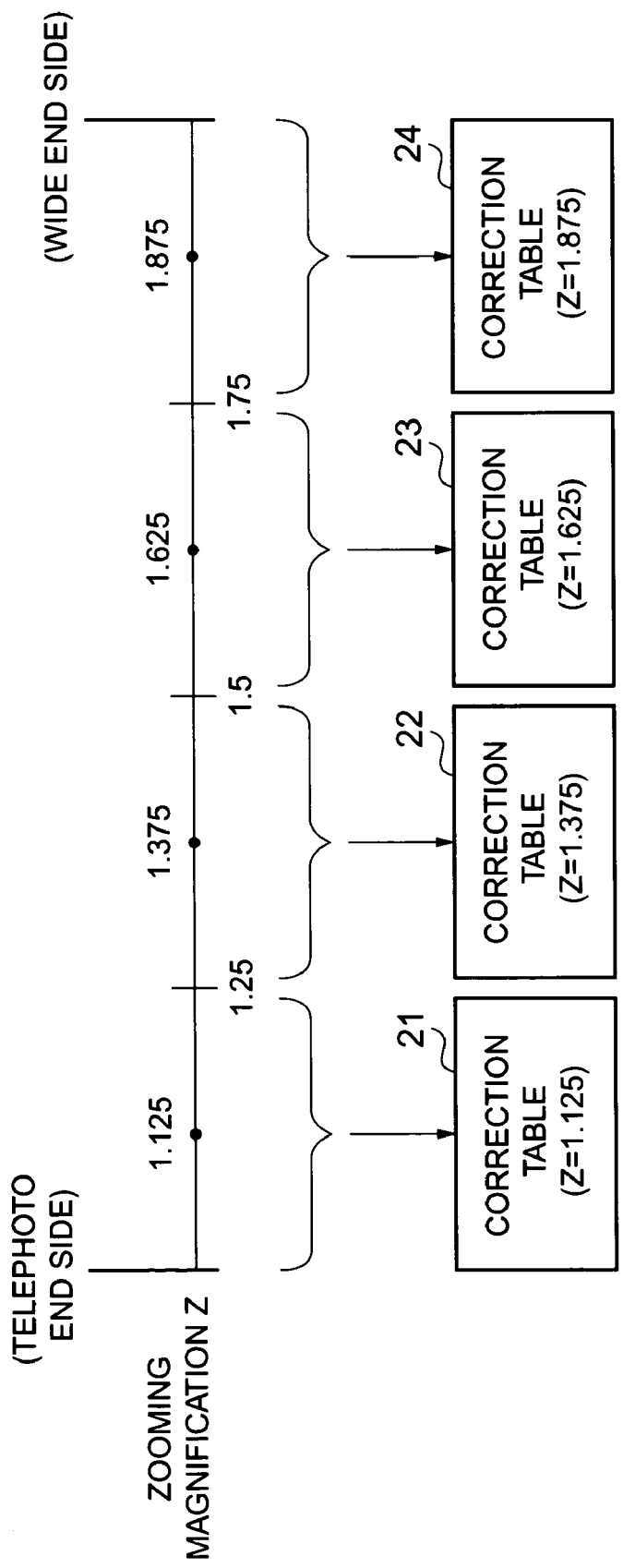
FIG. 7 is an explanatory diagram showing a zooming range of the projector shown in FIG. 1.

If the zooming magnification Z is set to, for example, Z=1.15, the optical mechanism unit 16 supplies the zooming magnification Z=1.15 to the switch control unit 26. Since this zooming magnification Z satisfies 1≦Z<1.25, the switch control unit 26 sets 1 to the selection signal S (the procedures of steps S11 and S12). Then, the switch control unit 26 supplies this selection signal S to the table selection unit 25 (the procedure of step S18). Since the value set to the supplied selection signal S is 1, the table selection unit 25 selects the correction table 21 to which coefficient sets for the zooming magnification Z=1.125 are set as shown in FIG. 7.

The transformation coefficient storing unit 13 selects one coefficient set from the coefficient sets 1 to 49 in the correction table 21 based on the inclination angles θH and θV supplied from the inclination angle detection sensor 12. For example, if the inclination angle θH is=−30° and the inclination angle θV is +30°, the transformation coefficient storing unit 13 selects the coefficient set 1.

The transformation coefficient storing unit 13 supplies the selected coefficient set 1 to the trapezoidal correction unit 14 via the table selection unit 25. The trapezoidal correction unit 14 assigns the supplied coefficient set 1 to the equation 1, calculates the coordinates (x', y') of the inverse transformation image according to the equation 1, and performs trapezoidal correction of the projection image.

The projection light conversion device 15 converts the image information corrected by the trapezoidal correction unit 14 into the projection light representing the image.

The optical mechanism unit 16 controls the focus so that the image will be formed on the screen 2, and projects the projection light resulting from the conversion by the projection light conversion device 15 onto the screen 2.

When the optical mechanism unit 16 projects the projection light resulting from the conversion by the projection light conversion device 15 onto the screen 2, the projection image expanded by 1.15-fold the original size is formed on the screen 2 without distortion even when the optical axis of the projector 1 is inclined with respect to the surface of the screen 2.

If the zooming magnification Z is set to, for example, Z=1.35, the optical mechanism unit 16 supplies the zooming magnification Z=1.35 to the switch control unit 26. Since this zooming magnification Z satisfies 1.25≦Z<1.5, the switch control unit 26 sets 2 to the selection signal S (the procedures of steps S13 and S14). Then, the switch control unit 26 supplies this selection signal S to the table selection unit 25 (the procedure of step S18).

Since the value of the supplied selection signal S is 2, the table selection unit 25 selects the correction table 22 in which coefficient sets for the zooming magnification Z=1.375 are set as shown in FIG. 7. The transformation coefficient storing unit 13 selects one coefficient set from the coefficient sets in the correction table 22 based on the inclination angles θH and θV, and supplies the selected coefficient set to the trapezoidal correction unit 14 via the table selection unit 25. The trapezoidal correction unit 14 assigns the coefficient set supplied from the transformation coefficient storing unit 13 to the equation 1 and performs trapezoidal correction in the same way.

When the optical mechanism unit 16 projects the projection light resulting from the conversion by the projection light conversion device 15 onto the screen 2, a projection image expanded by 1.35-fold the original image is formed on the screen 2 without distortion even when the optical axis of the projector 1 is inclined with respect to the surface of the screen 2.

In a case where the zooming magnification Z is set to, for example, Z=1.6, the optical mechanism unit 16 supplies the zooming magnification Z=1.6 to the switch control unit 26. Since this zooming magnification Z satisfies $1.5 \leq Z < 1.75$, the switch control unit 26 sets 3 to the selection signal S (the procedures of steps S15 and S16). The switch control unit 26 supplies this selection signal S to the table selection unit 25 (the procedure of step S18).

Since the value set to the supplied selection signal S is 3, the table selection unit 25 selects the correction table 23 in which coefficient sets for the zooming magnification Z=1.625 are set as shown in FIG. 7. The transformation coefficient storing unit 13 selects one coefficient set from the coefficient sets in the correction table 23 based on the inclination angles θH and θV, and supplies the selected coefficient set to the trapezoidal correction unit 14 via the table selection unit 25. The trapezoidal correction unit 14 assigns the coefficient set supplied from the transformation coefficient storing unit 13 to the equation 1, and performs trapezoidal correction in the same way.

When the optical mechanism unit 16 projects the projection light resulting from the conversion by the projection light conversion device 15 onto the screen 2, a projection image expanded by 1.6-fold the original image is formed on the screen 2 without distortion even when the optical axis of the projector 1 is inclined with respect to the surface of the screen 2.

If the zooming magnification Z is set to, for example, Z=1.9, the optical mechanism unit 16 supplies the zooming magnification Z=1.9 to the switch control unit 26. Since the zooming magnification Z satisfies $1.75 \leq Z \leq 2$, the switch control unit 26 sets 4 to the selection signal S (the procedures of steps S15 and S17). The switch control unit 26 supplies this selection signal S to the table selection unit 25 (the procedure of step S18).

Since the value set to the supplied selection signal S is 4, the table selection unit 25 selects the correction table 24 in which coefficient sets for the zooming magnification Z=1.875 are set as shown in FIG. 7. The transformation coefficient storing unit 13 selects one coefficient set from the coefficient sets in the correction table 24 based on the inclination angles θH and θV, and supplies the selected coefficient set to the trapezoidal correction unit 14 via the table selection unit 25. The trapezoidal correction unit 14 assigns the coefficient set supplied from the transformation coefficient storing unit 13 to the equation 1, and performs trapezoidal correction in the same way.

When the optical mechanism unit 16 projects the projection light resulting from the conversion by the projection light conversion device 15 onto the screen 2, a projection image expanded by 1.9-fold the original image is formed on the screen 2 without distortion even when the optical axis of the projector 1 is inclined with respect to the surface of the screen 2.

In this way, the trapezoidal correction unit 14 can perform trapezoidal correction appropriately in the range of zooming magnification Z=1 to 2.

As explained above, according to the first embodiment, the transformation coefficient storing unit 13 comprises the correction tables 21 to 24 which are generated based on the classification of the zooming magnification in a manner of arithmetic progression, and selects one correction table from the correction tables 21 to 24 based on the zooming magnification Z. Further, the transformation coefficient storing unit 13 selects a coefficient set from the selected correction table based on the inclination angles θH and θV and supplies the selected coefficient set to the trapezoidal correction unit 14. The trapezoidal correction unit 14 performs trapezoidal correction by using the supplied coefficient set.

Accordingly, a correction error due to the zooming magnification Z can be generally uniformly distributed in a wide range of zooming magnification. Therefore, the trapezoidal correction unit 14 can appropriately perform trapezoidal correction even if the zooming magnification Z is changed.

(Second Embodiment)

A projector according to the second embodiment is configured to perform interpolation of the zooming magnification.

Figure 8:
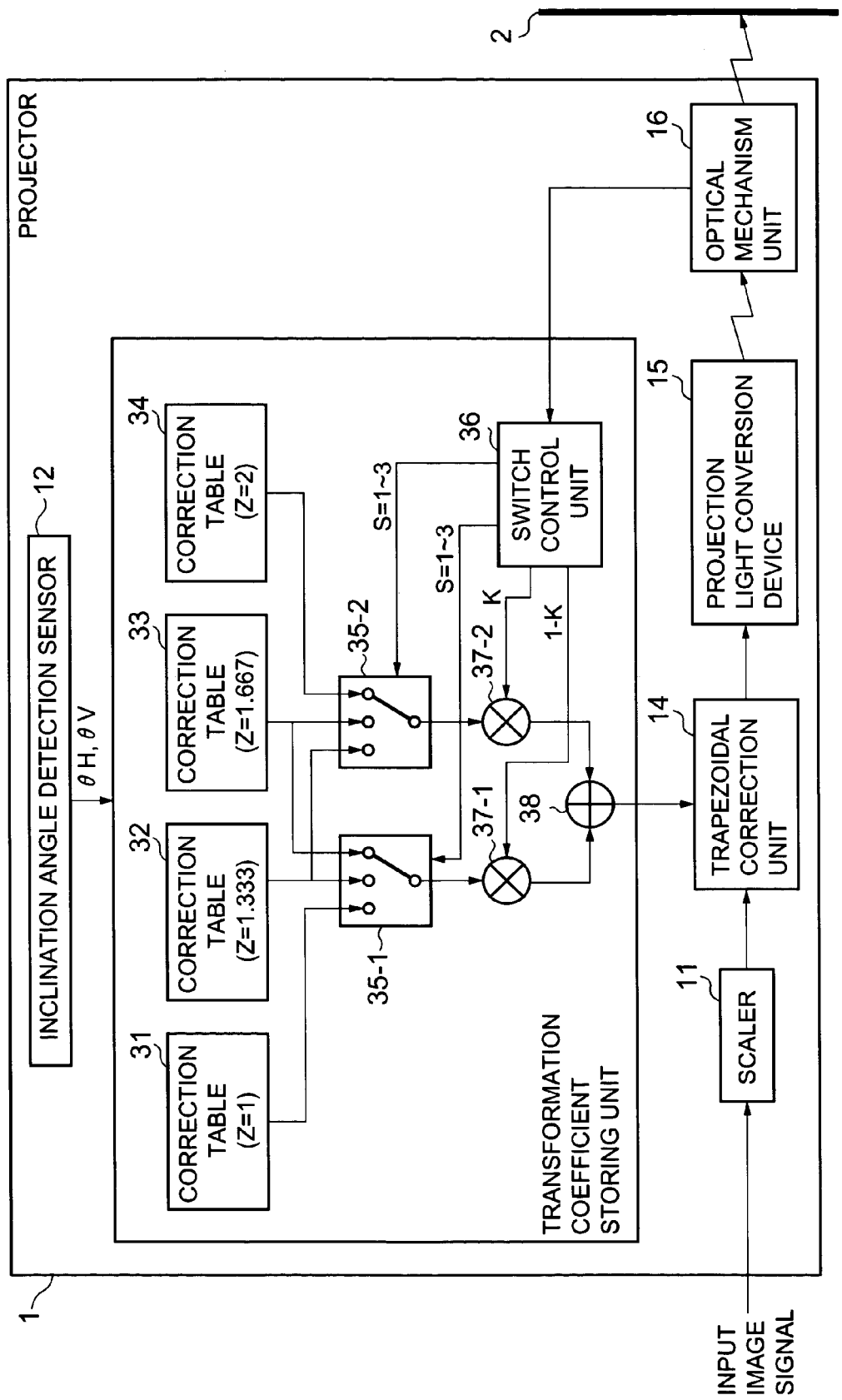
FIG. 8 is a block diagram showing a configuration of a projector according to a second embodiment of the present invention.

FIG. 8 shows the configuration of the projector according to the second embodiment.

The projector 1 according to the second embodiment comprises a transformation coefficient storing unit 30 as shown in FIG. 8.

The transformation coefficient storing unit 30 is configured to be capable of performing linear interpolation of the zooming magnification.

That is, the transformation coefficient storing unit 30 comprises correction tables 31 to 34, table selection units 35-1 and 35-2, a switch control unit 36, multipliers 37-1 and 37-2, and an adder 38.

The correction table 31 is a table in which coefficient sets for the zooming magnification Z=1 are set. The correction table 32 is a table in which coefficient sets for the zooming magnification Z=1.333 are set. The correction table 33 is a table in which coefficient sets for the zooming magnification Z=1.667 are set. The correction table 34 is a table in which coefficient sets for the zooming magnification Z=2 are set.

The table selection units 35-1 and 35-2 select any one of the correction tables 31 to 34 in accordance with the value of a selection signal S supplied from the switch control unit 36.

If the value of the selection signal S is 1, the table selection units 35-1 and 35-2 select the correction tables 31 and 32 respectively. If the value of the selection signal S is 2, the table selection units 35-1 and 35-2 select the correction tables 32 and 33 respectively. If the value of the selection signal S is 3, the table election units 35-1 and 35-2 select the correction tables 33 and 34 respectively.

The switch control unit 36 sets the value of the selection signal S and the value of an interpolation coefficient K ($0 \leq K \leq 1$), based on the zooming magnification Z supplied from the optical mechanism unit 16. The interpolation coefficient K is a coefficient used for linear interpolation.

If the supplied zooming magnification Z satisfies $1 \leq Z < 1.333$, the switch control unit 36 sets 1 to the selection signal S and $(3 \times Z - 3)$ to the interpolation coefficient K. If the supplied zooming magnification Z satisfies $1.333 \leq Z < 1.667$, the switch control unit 36 sets 2 to the selection signal S and (3×Z−4) to the interpolation coefficient K. If the supplied zooming magnification Z satisfies 1.667≦Z<2, the switch control unit 36 sets 3 to the selection signal S and (3×Z−5) to the interpolation coefficient K. The switch control unit 36 performs this switch control according to a flowchart to be described later.

The switch control unit 36 supplies the selection signal S to which a value is set, to the table selection units 35-1 and 35-2, and supplies interpolation coefficients (1-K) and K to the multipliers 37-1 and 37-2 respectively.

The multipliers 37-1 and 37-2 and the adder 38 perform linear interpolation calculation based on interpolation coefficients. First, the multiplier 37-1 multiplies the coefficient set in the correction table selected by the table selection unit 35-1 which coefficient set is to be supplied to the trapezoidal correction unit 14 by the interpolation coefficient (1-K) supplied from the switch control unit 36.

The multiplier 37-2 multiplies the coefficient set in the correction table selected by the table selection unit 35-2 which coefficient set is to be supplied to the trapezoidal correction unit 14 by the interpolation coefficient K supplied from the switch control unit 36. The adder 38 adds the two values output from the multipliers 37-1 and 37-2 respectively.

Next, the operation of the projector 1 according to the second embodiment will be explained.

Figure 9:
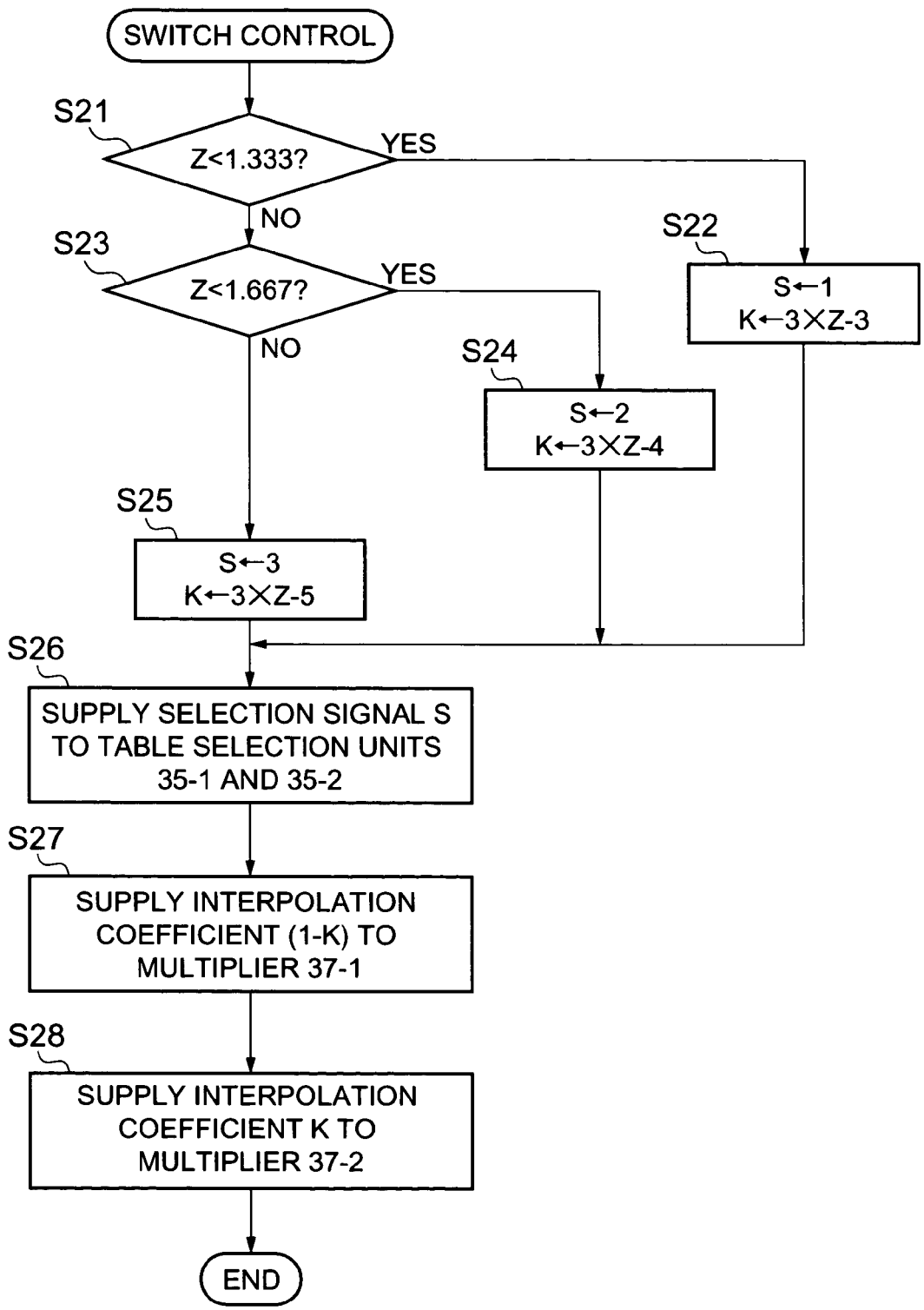
FIG. 9 is a flowchart showing a content of a table switch control process performed by a switch control unit shown in FIG. 8.

When the zooming magnification Z is supplied, the switch control unit 36 of the transformation coefficient storing unit 30 performs switch control of the correction tables according to a flowchart shown in FIG. 9.

The switch control unit 36 determines whether or not the zooming magnification Z is smaller than 1.333 (step S21).

In a case where determining that the zooming magnification Z is smaller than 1.333 (step S21: Yes), the switch control unit 36 sets 1 to the selection signal S and (3×Z−3) to the interpolation coefficient K (step S22).

In a case where determining that the zooming magnification Z is not smaller than 1.333 (step S21: No), the switch control unit 36 determines whether or not the zooming magnification Z is smaller than 1.667 (step S23).

In a case where determining that the zooming magnification Z is smaller than 1.667 (step S23: Yes), the switch control unit 36 sets 2 to the selection signal S and (3×Z−4) to the interpolation coefficient K (step S24).

In a case where determining that the zooming magnification Z is not smaller than 1.667 (step S23: No), the switch control unit 36 sets 3 to the selection signal S and (3×Z−5) to the interpolation coefficient K (step S25).

The switch control unit 36 outputs the selection signal S to which the value is set, to the table selection units 35-1 and 35-2 (step S26).

The switch control unit 36 supplies the interpolation coefficient (1-K) to the multiplier 37-1 (step S27).

The switch control unit 36 supplies the interpolation coefficient K to the multiplier 37-2 (step S28).

Next, this operation will be explained in detail.

If the zooming magnification is set to, for example, Z=1.2, the optical mechanism unit 16 supplies the zooming magnification Z=1.2 to the switch control unit 36. Since the zooming magnification satisfies 1≦Z<1.333, the switch control unit 36 sets 1 to the selection signal S, and sets 0.6 (=3×1.2−3) to the interpolation coefficient K (the procedures of steps S21 and S22).

The switch control unit 36 supplies the selection signal S to which 1 is set, to the table selection units 35-1 and 35-2 (the procedure of step S26).

The switch control unit 36 supplies the interpolation coefficient (1-K)=0.4 to the multiplier 37-1, and supplies the interpolation coefficient K=0.6 to the multiplier 37-2 (the procedures of steps S27 and S28).

Since the value set to the supplied selection signal S is 1, the table selection units 35-1 and 35-2 selects the correction tables 31 and 32 respectively.

The transformation coefficient storing unit 30 selects one coefficient set from each of the correction tables 31 and 32 based on the inclination angles θH and θV supplied from the inclination angle detection sensor 12.

The multiplier 37-1 multiplies each transformation coefficient in the coefficient set in the correction table 31 selected by the table selection unit 35-1 by the interpolation coefficient (1-K)=0.4 supplied from the switch control unit 36. The multiplier 37-2 multiplies each transformation coefficient in the coefficient set in the correction table 32 selected by the table selection unit 35-2 by the interpolation coefficient K=0.6 supplied from the switch control unit 36. The adder 38 adds all pairs of corresponding transformation coefficients in the two coefficient sets multiplied by the interpolation coefficients by the multipliers 37-1 and 37-2 respectively. The adder 38 supplies the values obtained by the addition to the trapezoidal correction unit 14.

These values are equal to the values in a coefficient set selected based on the inclination angles θH and θV from coefficient sets in a correction table which is generated for coefficient sets for the zooming magnification Z=1.2. And these values are equal to the values which are obtained when the zooming magnification Z=1 and the zooming magnification Z=1.333 are interpolated in a manner that the zooming magnification Z=1 accounts for 60 percent and the zooming magnification Z=1.333 accounts for 40 percent.

That is, by performing switch control according to the flowchart shown in FIG. 9, the switch control unit 36 brings about the same result which is obtained when the transformation coefficient storing unit 30 generates a correction table for the zooming magnification Z=1.2 by performing interpolation in a manner that the ratio between the zooming magnification Z=1 and the zooming magnification Z=1.333 becomes 60:40.

Then, when the switch control unit 36 supplies the coefficient set selected from the generated correction table to the trapezoidal correction unit 14, the trapezoidal correction unit 14 assigns the coefficient set supplied from the transformation coefficient storing unit 30 to the equation 1 to calculate the coordinates (x', y') of the inverse transformation image according to the equation 1, and performs trapezoidal correction of the projection image.

When the optical mechanism unit 16 projects a projection light obtained from conversion by the projection light conversion device 15 onto the screen 2, the projection image expanded by 1.2-fold the original image is formed on the screen 2 without distortion even when the optical axis of the projector 1 is inclined with respect to the surface of the screen 2.

Next, if the zooming magnification Z is set to, for example, Z=1.5, the optical mechanism unit 16 supplies the zooming magnification Z=1.5 to the switch control unit 36. Since this zooming magnification Z satisfies 1.333≦Z<1.667, the switch control unit 36 sets 2 to the selection signal S and sets 0.5 (=3×1.5−4) to the interpolation coefficient K (the procedures of steps S23 and S24).

The switch control unit 36 supplies the selection signal S to which 2 is set to the table selection units 35-1 and 35-2 (the procedure of step S26), and supplies interpolation coefficients (1-K)=0.5 and K=0.5 to the multipliers 37-1 and 37-2 respectively (the procedures of steps S27 and S28).

Since the value set to the supplied selection signal S is 2, the table selection units 35-1 and 35-2 select the correction tables 32 and 33 respectively.

Figure 10:
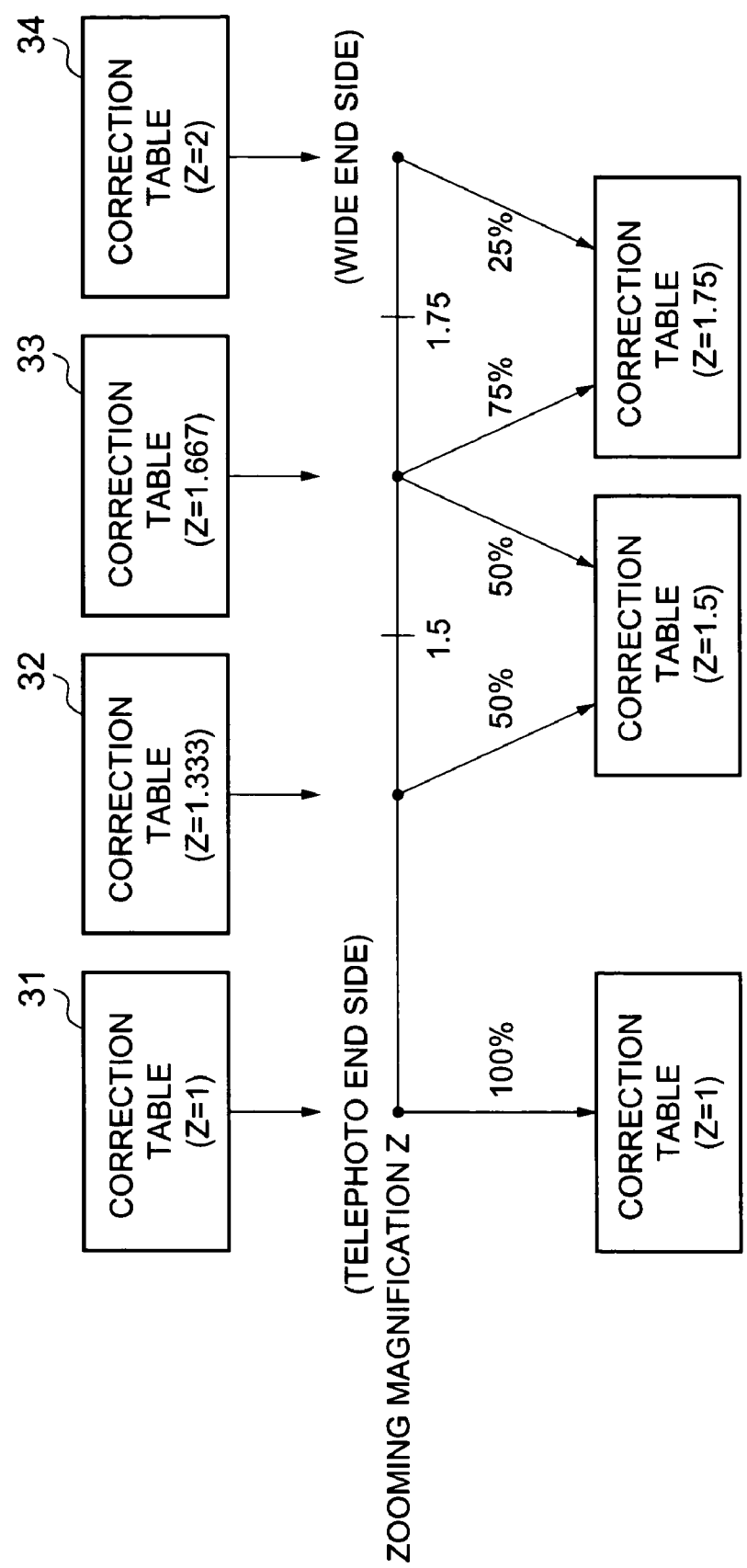
FIG. 10 is an explanatory diagram showing a zooming range of the projector shown in FIG. 8.

As a result, a correction table for the components for the zooming magnification Z=1.5 is generated as shown in FIG. 10, 50 percent of which components is the components for the zooming magnification Z=1.333 and the other 50 percent of which components is the components for the zooming magnification Z=1.667.

The transformation coefficient storing unit 30 supplies one coefficient set selected from the coefficient sets in the generated correction table based on the inclination angles θH and θV, to the trapezoidal correction unit 14. The trapezoidal correction unit 14 assigns the supplied coefficient set to the equation 1 to calculate the coordinates (x', y') of the inverse transformation image, and performs trapezoidal correction of the projection image.

When the optical mechanism unit 16 projects a projection light obtained from conversion by the projection light conversion device 15 onto the screen 2, a projection image expanded by 1.5-fold the original image is formed on the screen 2 without distortion even when the optical axis of the projector 1 is inclined with respect to the surface of the screen 2.

Next, if the zooming magnification Z is set to, for example, Z=1.75, the optical mechanism unit 16 supplies the zooming magnification Z=1.75 to the switch control unit 36. Since the zooming magnification Z satisfies 1.667≦Z<2, the switch control unit 36 sets 3 to the selection signal S and sets 0.25 (=3×1.75−5) to the interpolation coefficient K (the procedures of steps S23 and S25).

The switch control unit 36 supplies the selection signal S to which 3 is set, to the able selection units 35-1 and 35-2 (the procedure of step S26), and supplies interpolation coefficients 0.75 and 0.25 to the multipliers 37-1 and 37-2 respectively (the procedures of steps S27 and S28).

Since the value set to the supplied selection signal S is 3, the table selection units 35-1 and 35-2 select the correction tables 33 and 34 respectively.

As a result, a correction table for the components for the zooming magnification Z=1.75 is generated as shown in FIG. 10, 75 percent of which components is the components for the zooming magnification Z=1.667 and the remaining 25 percent of which components is the components for the zooming magnification Z=2.

The transformation coefficient storing unit 30 supplies one coefficient set selected from the coefficient sets in the generated correction table based on the inclination angles θH and θV to the trapezoidal correction unit 14. The trapezoidal correction unit 14 assigns the supplied coefficient set to the equation 1 to calculate the coordinates (x', y') of the inverse transformation image according to the equation 1, and performs trapezoidal correction of the projection image.

When the optical mechanism unit 16 projects a projection light obtained from conversion by the projection light conversion device 15 onto the screen 2, a projection image which is expanded by 1.75-fold the original image is formed on the screen 2 without distortion even when the optical axis of the projector 1 is inclined with respect to the surface of the screen 2.

If the zooming magnification Z is 1, the switch control unit 36 sets 1 to the selection signal S and 0 to the interpolation coefficient K, and a correction table for the zooming magnification Z=1 is generated in the same manner. In a case where the zooming magnification Z is 2, the switch control unit 36 sets 3 to the selection signal S and 1 to the interpolation coefficient K, and a correction table for the zooming magnification Z=2 is generated. In this manner, the trapezoidal correction unit 14 can perform trapezoidal correction continuously and smoothly within the range of Z=1 to 2.

As explained above, according to the second embodiment, linear interpolation of the zooming magnification Z is performed. Accordingly, a correction error due to the zooming magnification Z can be reduced.

If the value of the selection signal S is set to 1 and the value of the interpolation coefficient K is set to 0, a correction set for the zooming magnification Z=1 can be selected. Further, if the value of the selection signal S is set to 3 and the value of the interpolation coefficient K is set to 1, a coefficient set for the zooming magnification Z=2 can be selected. Therefore, a coefficient set can be selected in a wide range of zooming magnification.

The present invention is not limited to the above-described embodiment but can be implemented in various embodiments.

For example, according to the above-described embodiments, the number of correction tables is four. However, the number of correction tables is not limited to this but may be increased or decreased.

For example, it is possible to increase the number of correction tables thereby to expand the range of the zooming magnification Z. Or it is possible to perform trapezoidal correction with higher precision by increasing the number of correction tables while keeping the range of the zooming magnification Z to Z=1 to 2 and by narrowing the interval between the center values of the respective correction tables.

In the first embodiment, the transformation coefficient storing unit 13 may be configured to supply the trapezoidal correction unit 14 with a coefficient set which additionally includes an error of focal length of the optical mechanism unit 16. In this case, a range based on this error of focal length is set for each transformation coefficient in the correction tables 21 to 24. With this configuration, even if the focal length of the optical mechanism unit 16 includes an assembly error, this error is absorbed and trapezoidal correction can be performed with higher precision.

In the second embodiment, linear interpolation is used for interpolating the zooming magnification. However, the interpolation manner is not limited to linear interpolation.

In the correction table shown in FIG. 3, the increment of each of the inclination angles θH and θV for setting the coefficient sets is 10 degrees, in order to simplify the explanation. However, the increment of the inclination angles θH and θV for actually setting the coefficient sets for the correction tables is set smaller than 10 degrees. By setting the increment of the inclination angles θH and θV small, it is possible to perform transformation corresponding to the zooming magnification with high precision.

Another configuration in which coefficient sets are obtained by linear interpolation is available. That is, four coefficient sets are selected from a correction table based on the inclination angles 74 H and θV obtained by the inclination angle detection sensor 12 and linear interpolation is performed based on the selected four coefficient sets.

This configuration will be explained with reference to the correction table shown in FIG. 3. First, it is assumed that the inclination angles θH and θV detected by the inclination angle detection sensor 12 are 23.4 degrees and 17.9 degrees respectively.

The increment of each of the inclination angles θH and θV is 10 degrees in the correction table shown in FIG. 3. Therefore, "2" and "3.4" of the inclination angle θH are regarded as upper-order information HU and lower-order information HL of the inclination angle θH respectively, and "1" and "7.9" of the inclination angle θV are regarded as upper-order information VU and lower-order information VL of the inclination angle θV respectively.

The upper-order information HU and lower-order information HL of the inclination angle θH are obtained respectively as the quotient and remainder resulting from dividing the inclination angle θH detected by the inclination angle detection sensor 12 by the 10-degree increment of the inclination angle θH in the correction table.

The upper-order information VU and lower-order information VL of the inclination angle θV are likewise obtained respectively as the quotient and remainder resulting from dividing the inclination angle θV detected by the inclination angle detection sensor 12 by the 10-degree increment of the inclination angle θV in the correction table.

Inclination angles θH and θV in the correction table which are used for linear interpolation are obtained by assigning the upper-order information HU and lower-order information HL of the inclination angle θH and the upper-order information VU and lower-order information VL of the inclination angle θV to the following equations 2.

$$\theta H(1) = HU \times 10 = 20$$

$$\theta V(1) = VU \times 10 = 10$$

$$\theta H(2) = (HU+1) \times 10 = 30$$

$$\theta V(2) = VU \times 10 = 10$$

$$\theta H(3) = HU \times 10 = 20$$

$$\theta V(3) = (VU+1) \times 10 = 20$$

$$\theta H(4) = (HU+1) \times 10 = 30$$

$$\theta V(4) = (VU+1) \times 10 = 20 \quad \text{[Equation 2]}$$

That is, the pairs of inclination angles θH and θV in the correction table that are used for linear interpolation are 20 degrees and 10 degree, 30 degrees and 10 degrees, 20 degrees and 20 degrees, and 30 degrees and 20 degrees, respectively. The coefficient sets corresponding to the respective pairs are 20, 21, 13, and 14. In this manner, the coefficient sets 20, 21, 13, and 14 corresponding to these pairs of inclination angles θH and θV are selected.

Next, linear interpolation is performed by using the selected coefficient sets 20, 21, 13, and 14 in order to obtain transformation coefficients. It is assumed that coefficients in the coefficient set 20 are a20, b20, c20, . . . , coefficients in the coefficient set 21 are a21, b21, c21, . . . , coefficients in the coefficient set 13 are a13, b13, c13, . . . , and coefficients in the coefficient set 14 are a14, b14, c14, . . . In this case, the coefficients a, b, and c after linear interpolation are obtained by the following equations 3.

$$a1 = \frac{10-HL}{10} \cdot \frac{10-VL}{10} a20 + \quad \text{[Equations 3]}$$
$$\frac{HL}{10} \cdot \frac{10-VL}{10} a21 + \frac{10-HL}{10} \cdot \frac{VL}{10} a13 + \frac{HL}{10} \cdot \frac{VL}{10} a14$$

-continued $$b2 = \frac{10-HL}{10} \cdot \frac{10-VL}{10} b20 +$$
$$\frac{HL}{10} \cdot \frac{10-VL}{10} b21 + \frac{10-HL}{10} \cdot \frac{VL}{10} b13 + \frac{HL}{10} \cdot \frac{VL}{10} b14$$

$$c3 = \frac{10-HL}{10} \cdot \frac{10-VL}{10} c20 +$$
$$\frac{HL}{10} \cdot \frac{10-VL}{10} c21 + \frac{10-HL}{10} \cdot \frac{VL}{10} c13 + \frac{HL}{10} \cdot \frac{VL}{10} c14$$

According to the first embodiment, the transformation coefficient storing unit 13 supplies the coefficients a, b, c, . . . obtained in this manner, to the trapezoidal correction unit 14. According to the second embodiment, the transformation coefficient storing unit 13 further applies linear interpolation to these coefficients based on the zooming magnification and supplies the coefficients to the trapezoidal correction unit 14. Then, the trapezoidal correction unit 14 performs correction. By obtaining transformation coefficients by using four coefficient sets in this manner, the precision for transformation of the inclination angles θH and θV is improved and high transformation precision can therefore be obtained without changing the size of the correction table.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-290841 filed on Aug. 8, 2003 and including specification, claims, drawings and summary. The disclosure of the above Japanese Patent Application is incorporated herein by reference in its entirety.

What is claimed is:

1. A projector comprising:
a projection unit which has a zooming function and converts image information of a supplied projection image into information of a projection light and projects the projection light onto a screen surface;
a correction unit which corrects a projection image on the screen surface by inverse transformation using transformation coefficients , said projection image being distorted due to inclinations of an optical axis of the projection light with respect to the screen surface, and supplies information of the corrected projection image to the projection unit; and
a transformation coefficient supply unit which obtains information regarding a zooming magnification of the projection unit and inclination angles of the optical axis of the projection light with respect to the screen surface, selects the transformation coefficients from preset transformation coefficients based on the obtained zooming magnification and inclination angles, and supplies the selected transformation coefficients to the correction unit;
wherein the transformation coefficient supply unit comprises:
a plurality of transformation coefficient tables, each of which stores transformation coefficients preset based on the inclination angles, in association with one of a plurality of zooming magnifications;

a table selection unit which is supplied with a selection signal and selects a transformation coefficient table from the plurality of transformation coefficient tables in accordance with the supplied selection signal; and a control unit which generates the selection signal based on the obtained information regarding the zooming magnification of the projection unit, and controls the table selection unit by supplying the generated selection signal thereto such that the table selection unit selects the transformation coefficient table associated with the obtained zooming magnification, and the transformation coefficient supply unit selects the transformation coefficients from transformation coefficients stored in the transformation coefficient table selected by the table selection unit based on the obtained inclination angles, and supplies the selected transformation coefficients to the correction unit.

2. The projector according to claim 1, wherein the transformation coefficient supply unit sets a range of the transformation coefficients based on an error of focal length of the projection unit, and supplies the selected transformation coefficients to the correction unit.

3. The projector according to claim 1, wherein:

the control unit sets an interpolation coefficient based on the obtained information regarding the zooming magnification of the projection unit and supplies the interpolation coefficient to the table selection unit; and the table selection unit selects a plurality of the transformation coefficient tables in accordance with the selection signal supplied from the control unit, and performs interpolation between the plurality of selected transformation coefficient tables based on the interpolation coefficient supplied from the control unit, whereby the transformation coefficient supply unit performs interpolation between the zooming magnifications of the plurality of transformation coefficient tables.

4. A projection image correction method for correcting a projection image projected by a projector, comprising:

obtaining information regarding a zooming magnification of the projector and inclination angles of an optical axis of a projection light of the projector with respect to a screen surface;

storing a plurality of transformation coefficients which are preset for correcting the projection image by inverse transformation, in association with each zooming magnification and each inclination angle;

obtaining the zooming magnification and inclination angles of the projector; and selecting transformation coefficients from the plurality of stored transformation coefficients based on the obtained zooming magnification and inclination angles, and correcting the projection image by inverse transformation based on the selected transformation coefficients;

wherein the selecting of the transformation coefficients comprises:

providing a plurality of transformation coefficient tables, each of which stores transformation coefficients preset based on the inclination angles, in association with one of a plurality of zooming magnifications;

generating a selection signal based on the obtained zooming magnification of the projector;

selecting a transformation coefficient table from the plurality of transformation coefficient tables in accordance with the selection signal, so as to select the transformation coefficient table associated with the obtained zooming magnification; and selecting the transformation coefficients from transformation coefficients stored in the selected transformation coefficient table based on the obtained inclination angles.

5. The projection image correcting method according to claim 4, wherein the selecting of the transformation coefficients further comprises setting a range of the transformation coefficients based on an error of focal length of the projector.

6. The projection image correcting method according to claim 4, further comprising setting an interpolation coefficient based on the obtained information regarding the zooming magnification of the projector;

wherein the selecting of the transformation coefficient table comprises selecting a plurality of the transformation coefficient tables in accordance with the selection signal, and performing interpolation between the plurality of selected transformation coefficient tables based on the interpolation coefficient, such that interpolation is performed between the zooming magnifications of the plurality of transformation coefficient tables.

* * * * *